United States Patent
Das (10) Patent No.: US 11,257,242 B2
(45) Date of Patent: Feb. 22, 2022

(54) METHOD AND DEVICE FOR DETERMINING OPERATION OF AN AUTONOMOUS DEVICE

(71) Applicant: Wipro Limited, Bangalore (IN)

(72) Inventor: Rishav Das, Howrah (IN)

(73) Assignee: Wipro Limited, Bangalore (IN)

( * ) Notice: Subject to any disclaimer, the term of this patent is extended or adjusted under 35 U.S.C. 154(b) by 182 days.

(21) Appl. No.: 16/282,357

(22) Filed: Feb. 22, 2019

(65) Prior Publication Data

US 2020/0211213 A1 Jul. 2, 2020

(30) Foreign Application Priority Data

Dec. 31, 2018 (IN) .............................. 201811050076

(51) Int. Cl.
 *G06T 7/70* (2017.01)
 *G05D 1/00* (2006.01)
 (Continued)

(52) U.S. Cl.
 CPC ............. *G06T 7/70* (2017.01); *G05D 1/0088* (2013.01); *G05D 1/0214* (2013.01);
 (Continued)

(58) Field of Classification Search
 None
 See application file for complete search history.

(56) References Cited

U.S. PATENT DOCUMENTS

| 5,092,645 A | 3/1992 | Okada |
| 8,983,089 B1 * | 3/2015 | Chu ................. H04R 3/005 381/92 |

(Continued)

FOREIGN PATENT DOCUMENTS

| CN | 102609688 A | * | 7/2012 |
| CN | 106679651 A | * | 5/2017 |

OTHER PUBLICATIONS

Badali et al. ("Evaluating Real-time Audio Localization Algorithms for Artificial Audition in Robotics", 2009 IEEE/RSJ International Conference on Intelligent Robots and Systems, Oct. 11-15, 2009 St. Louis, USA) (Year: 2009).*

(Continued)

*Primary Examiner* — Richard A Hansell, Jr.
(74) *Attorney, Agent, or Firm* — Finnegan, Henderson, Farabow, Garrett & Dunner, LLP (57) ABSTRACT

A method and device for determining operation of an autonomous device is disclosed. The method includes receiving pixel data and sound data associated with an environment at an instance of time, wherein the pixel data is received from least an image sensor associated with the autonomous device, and wherein the sound data is received from at least four sound sensors placed in a quadrilateral configuration on the autonomous device. Each quadrant of the pixel data is associated with each of the at least four sound sensors. The sound data received is mapped the to the matrix to identify one or more pixels in the matrix corresponding to the sound data based on a difference in amplitude between a first sound sensor of the at least four sound sensors recording maximum sound amplitude with a plurality of second sound sensors of the at least four sound sensors.

15 Claims, 6 Drawing Sheets

(51) Int. Cl.
*G05D 1/02* (2020.01)
*G10L 25/51* (2013.01)

(52) U.S. Cl.
CPC ... *G05D 1/0255* (2013.01); *G05D 2201/0213* (2013.01); *G06T 2207/10004* (2013.01); *G06T 2207/30261* (2013.01); *G10L 25/51* (2013.01)

(56) References Cited

U.S. PATENT DOCUMENTS

| | | | | |
|---|---|---|---|---|
| 10,042,038 | B1* | 8/2018 | Lord | G10L 25/51 |
| 10,429,839 | B2* | 10/2019 | Liu | G05D 1/0088 |
| 2008/0034869 | A1* | 2/2008 | Heinz | G01H 3/125 |
| | | | | 73/572 |
| 2010/0271199 | A1* | 10/2010 | Belov | G01M 5/0008 |
| | | | | 340/539.3 |
| 2017/0186441 | A1* | 6/2017 | Wenus | G01S 5/18 |
| 2017/0272699 | A1* | 9/2017 | Stopek | H04N 7/147 |
| 2017/0280108 | A1* | 9/2017 | Matsumoto | G01S 5/20 |
| 2018/0186369 | A1* | 7/2018 | Reiff | B60W 10/18 |
| 2019/0287297 | A1* | 9/2019 | Abhiram | G06T 7/246 |
| 2019/0370545 | A1* | 12/2019 | Josephson | G06T 15/06 |

OTHER PUBLICATIONS

Rascon C. and I. Meza, "Localization of sound sources in robotics: A review", Robotics and Autonomous Systems 96 (2017), 184-210) (Year: 2017).*
Chu, S., et al., "Where Am I? Scene Recognition for Mobile Robots Using Audio Features", IEEE International Conference on Multimedia & Expo (ICME) (2006), 4 pages.
Lathuiliere, S. et al., "Neural Network Based Reinforcement Learning for Audio-Visual Gaze Control in Human-Robot Interaction", ScienceDirect, Apr. 23, 2018, pp. 1-16.
Se., S., et al., "Vision-Based Global Localization and Mapping for Mobile Robots", IEEE Transactions on Robotics, vol. 21, No. 3, Jun. 2005, pp. 364-375.

* cited by examiner

FIG. 6: Computer System

METHOD AND DEVICE FOR DETERMINING OPERATION OF AN AUTONOMOUS DEVICE

TECHNICAL FIELD

The present subject matter is related, in general to autonomous devices, and more particularly, but not exclusively to a method and device for determining operation of an autonomous device.

BACKGROUND

Today's technology is embracing Artificial Intelligence (AI) like never before. With the advent of AI development of various in-built intelligence in various electro-mechanical systems have come to the fore. AI have been aiding humans to shift their workload to machine more reliably and in more and more areas that have been completely under human control. Currently, most of the existing robotic machine architectures include various standardized sensor interfaces, processors, different limb actuators and various rotary parts. Sensors can determine the visual sight of the environment and they are programmed to determine the matched insight and perform the required actions based on the match.

Presently the algorithms for these robotic systems or autonomous devices are built with defined rules to follow the set of conditions and then move robotic actuator systems accordingly. Presently, the algorithms do not assess environmental situation in real time surrounding the autonomous device while determining an output for their operation. Currently autonomous devices such as robots, autonomous vehicle or drones do not identify and dynamicity of environment like humans do. Moreover, presently autonomous devices are not prepared to handle any unforeseen changes in environment and intelligently determine a required action to be taken.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

According to embodiments illustrated herein, there may be provided a method of determining operation of an autonomous device. The method may include receiving, by an operation determination device, pixel data and sound data associated with an environment at an instance of time, wherein the pixel data is received from at least an image sensor associated with the autonomous device, and wherein the sound data is received from by at least four sound sensors placed in a quadrilateral configuration on the autonomous device. The method may include associating, by the operation determination device, each quadrant of the pixel data, the pixel data being rendered in a matrix, with each of the at least four sound sensors. The method may include mapping, by the operation determination device, the sound data captured by the at least four sound sensors to the matrix to identify one or more pixels in the matrix corresponding to the sound data based on a difference in amplitude between a first sound sensor of the at least four sound sensors recording maximum sound amplitude with a plurality of second sound sensors of the at least four sound sensors. The method may further include determining, by the operation determination device, the operation of the autonomous device based on the identification of the one or more pixels corresponding to the sound data.

According to embodiments illustrated herein, there may be provided an operation determination device for determining operation of an autonomous device. The operation determination device may include processor and a memory communicatively coupled to the processor, wherein the memory stores processor-executable instructions. The processor may execute the processor-executable instructions to receive pixel data and sound data associated with an environment at an instance of time, wherein the pixel data is received from at least an image sensor associated with the autonomous device, and wherein the sound data is received from at least four sound sensors placed in a quadrilateral configuration on the autonomous device. The processor may execute the processor-executable instructions to associate each quadrant of the pixel data, the pixel data being rendered in a matrix, with each of the at least four sound sensors. The processor may execute the processor-executable instructions to map the sound data captured by the at least four sound sensors to the matrix to identify one or more pixels in the matrix corresponding to the sound data based on a difference in amplitude between a first sound sensor of the at least four sound sensors recording maximum sound amplitude with a plurality of second sound sensors of the at least four sound sensors. Further, the processor may execute the processor-executable instructions to determine the operation of the autonomous device, based on the identification of the one or more pixels corresponding to the sound data.

According to another embodiment illustrated herein there may be provided a non-transitory computer readable medium including instructions stored thereon that when processed by at least one processor cause an operation determination device associated with an autonomous device to determine one or more operations of the autonomous device. The instructions stored thereon on being processed by the at least one processor may cause the processor to receive pixel data and sound data associated with an environment of the autonomous device at an instance of time, wherein the pixel data is received from least an image sensor associated with the autonomous device, and wherein the sound data is received from at least four sound sensors placed in a quadrilateral configuration on the autonomous device. Further, the instructions may cause the processor to associate each quadrant of the pixel data, the pixel data being rendered in a matrix, with each of the at least four sound sensors. Further, the instructions may cause the processor to map the sound data received from by the at least four sound sensors to the matrix to identify one or more pixels in the matrix corresponding to the sound data based on a difference in amplitude between a first sound sensor of the at least four sound sensors recording maximum sound amplitude with a plurality of second sound sensors of the at least four sound sensors. Further, the instructions may cause the processor to determine the operation of the autonomous device based on the identification of the one or more pixels corresponding to the sound data.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Figure 1:
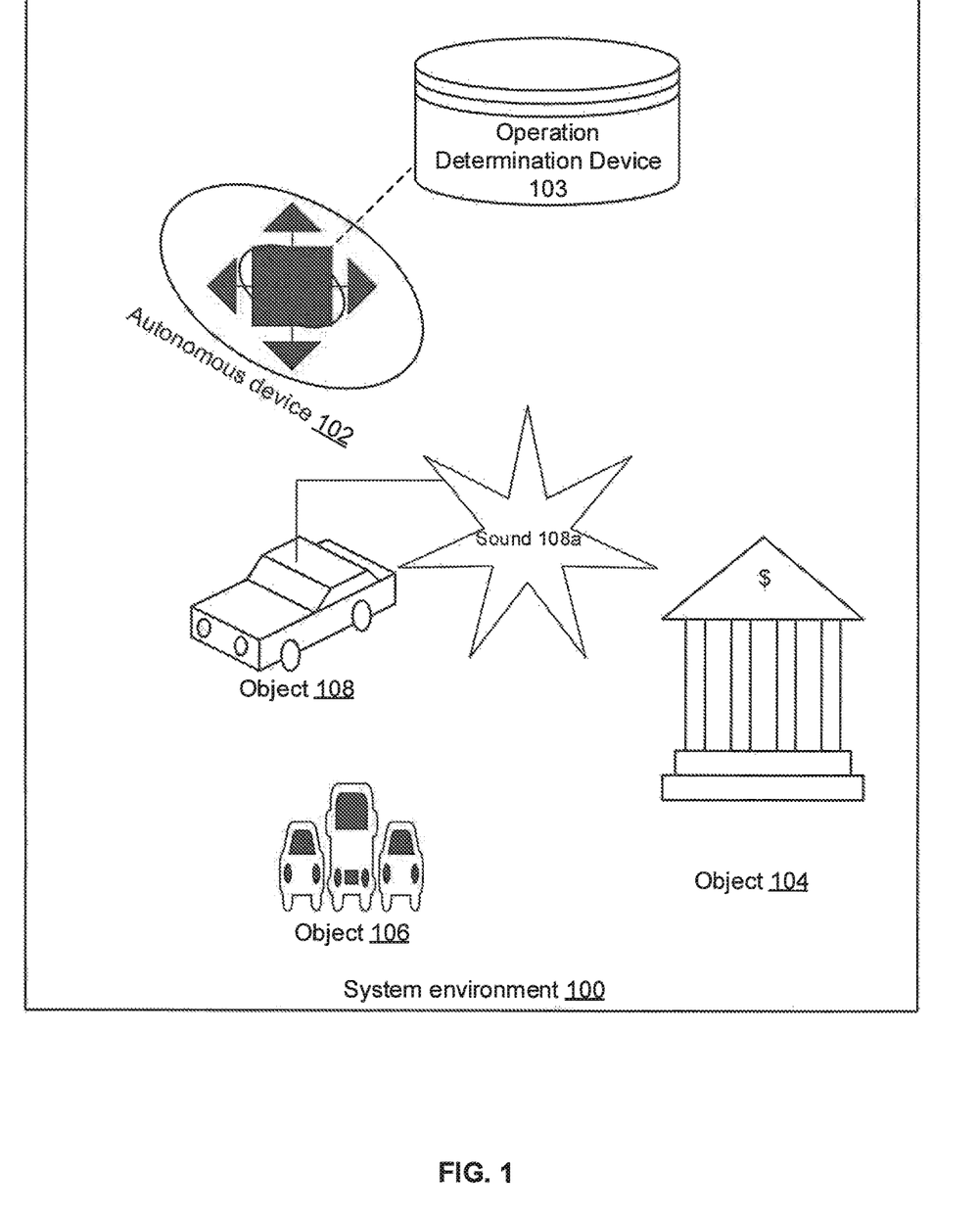
FIG. 1 is a block diagram that illustrates an exemplary system environment in which a method and device for determining operation of an autonomous device may be implemented.

Referring to FIG. 1, an exemplary system environment 100 in which various embodiments of the method and device for determining operations of an autonomous device that may be employed, is illustrated. Environment 100 illustrates an exemplary autonomous device 102 that has been represented as a drone in FIG. 1. Examples of autonomous device 102 may include, but are not limited to a drone, an autonomous car, a robot or any device capable of making autonomous decisions. In the exemplary scenario autonomous device 102 (also referred to as drone 102), may be operating in an environment with elements in the environment such as objects 104, 106 and 108. Drone 102 may include an operation determination device such as operation determination device 103 integrated with it. In an alternate embodiment operation determination device 103 may operate remotely by means of a communication network. It becomes necessary for an autonomous device 102 such as drone 102 or an autonomous vehicle to detect the nature of its surrounding environment for autonomous maneuvering. Autonomous device 102 such as drone 102 or a vehicle may be equipped for obstacle avoidance by means of pre-programming. For example, the drone may be equipped to avoid moving towards an obstacle such as object 104 which may be a building appearing ahead of the drone. However, an object 108 such as a speeding vehicle may suddenly appear and thus drone 102 may needed to be controlled by determining the operations of the drone with respect to the sudden change in its environment. In an example drone 102 may be intelligently required to locate a speeding vehicle and click a close-up snapshot of the vehicle such as object 108 in FIG. 1 In this exemplary scenario a distinct sound 108a may be detected by drone 102 and the origin of the sound many be detected by drone 102 to be object 108 by means of mapping of pixel data and sound data as received by drone 102. The method has been elaborated later in the specification in details in conjunction with FIG. 3, FIG. 4 and FIG. 5c.

Figure 2:
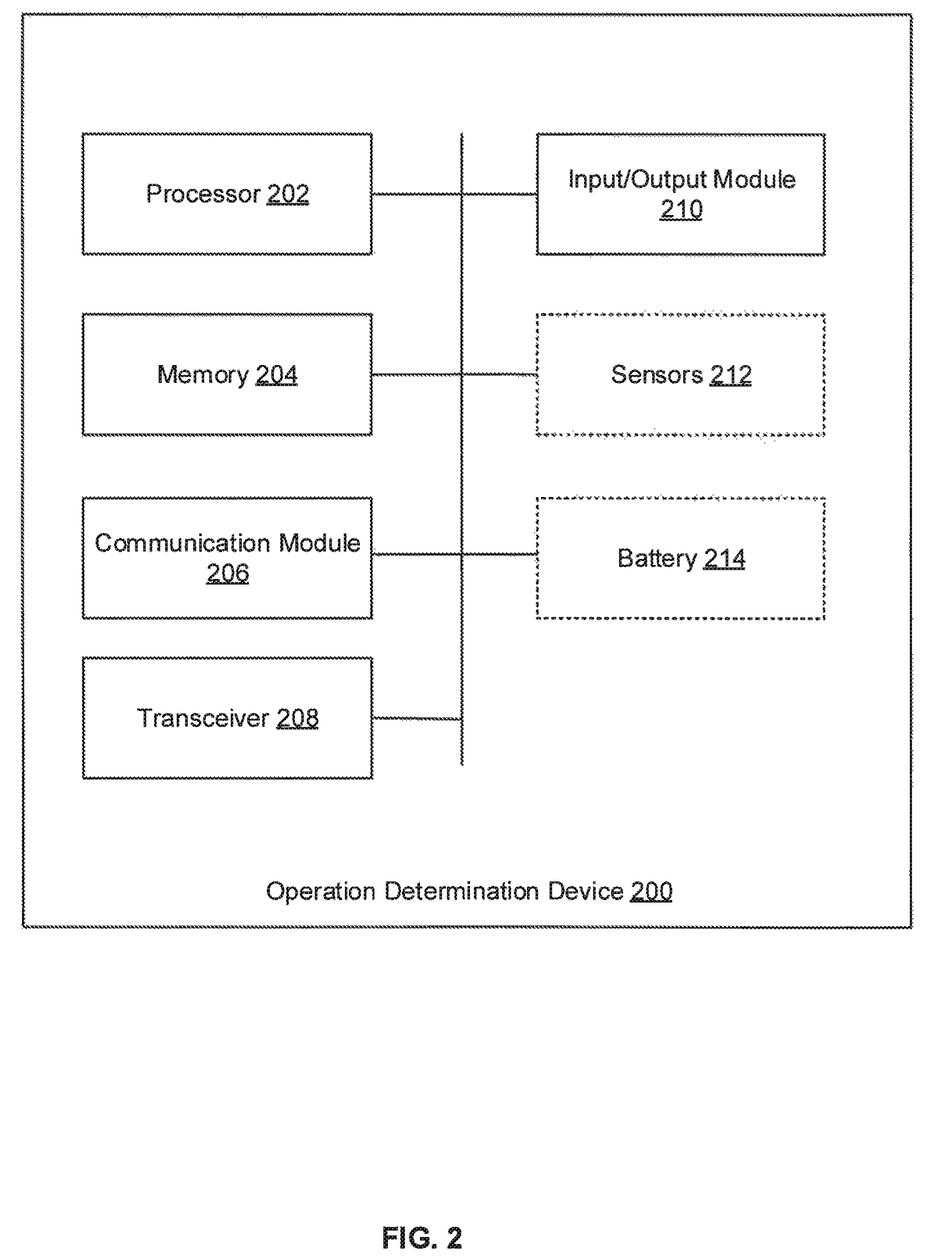
FIG. 2 is a block diagram that illustrates an operation determination device in accordance with some embodiments of the present disclosure.

Referring now to FIG. 2, a block diagram of operation determination device 200, similar to that of operation determination device 103 of FIG. 1 for controlling autonomous device 102 is illustrated, in accordance with an embodiment. Operation determination device 200 may be integrated within autonomous device 102. Alternatively, operation determination device 200 may be a mobile device that might be placed within autonomous device 102 or may be controlling or determining operations of the autonomous device 102 from a remote location. In this case, examples of operation determination device 200 may include any computing device including processor and memory. Additionally, operation determination device 200 may be mobile device and may communicate with autonomous device 102 via a communication network (not shown in FIG. 2). Examples of the communication network may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

Operation determination device 200 includes a processor such as processor 202 that is coupled to a memory such as memory 204. Memory 204 stores instructions for processor 202, which, on execution, causes processor 202 to perform desired operations. The processor 202 comprises suitable logic, circuitry, interfaces, and/or code that may be configured to execute a set of instructions stored in the memory 204. Processor 202 may be implemented based on a number of processor technologies known in the art. Examples of processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

Memory 204 comprises suitable logic, circuitry, interfaces, and/or code that may be configured to store the set of instructions, which are executed by the processor 202. In an embodiment, memory 204 may be configured to store one or more programs, routines, or scripts that may be executed in coordination with the processor 202. Memory 204 may be implemented based on a Random Access Memory (RAM), a Read-Only Memory (ROM), a Hard Disk Drive (HDD), a storage server, and/or a Secure Digital (SD) card. Memory 204 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include but are not limited Dynamic Random Access Memory (DRAM), and Static Random-Access memory (SRAM). Various modules in memory 204 are further explained in detail in conjunction with FIG. 3.

In an embodiment operation determination device 200 may communicate with autonomous device management system onboard autonomous device 102 via communication module 206, which may support multiple communication protocols. Examples of these communication protocols may include, but are not limited to WLAN, Wi-Fi, LTE, WiMAX, GPRS, Bluetooth, Zigbee, Infrared, NearBytes, and NFC. In an embodiment, communication module 206 may correspond to a communication medium through which various modules of the operation determination device may communicate with each other. Further, communication module 206 may correspond to a communication medium through which various modules of the operation determination device 200 may communicate with the autonomous device 102 or an autonomous device management system that may be extraneous to the autonomous device 102. Operation determination device 200 may communicate with sensors such as the image sensors and the sound sensors of the autonomous device 102 the communication module 308. Examples of these communication protocols may include, but are not limited to WLAN, Wi-Fi, LTE, WiMAX, GPRS, Bluetooth, Zigbee, Infrared, NearBytes, and NFC. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 108 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

Transceiver 208 may include of suitable logic, circuitry, interfaces, and/or code that may be configured to transmit a set of operations as determined by operation determination device, via communication module 206. Transceiver 208 may be further configured to receive information pertaining to sound sensors and image sensors of the autonomous device 102. Transceiver 208 may implement one or more known technologies to support wired or wireless communication with the communication network. In an embodiment, transceiver 208 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. Transceiver 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In some embodiments operation determination device 200 may include Input/Output (I/O) module 210 that may be configured to receive an input or transmit an output for a human operator. The input/output module 210 comprises of various input and output devices that are configured to communicate with the processor 202. Examples of the input devices include, but are not limited to, a keyboard, a mouse, a joystick, a touch screen, a microphone, and/or a docking station. Examples of the output devices include, but are not limited to, a display screen and/or a speaker. To issue notifications or warnings, operation determination device 200 may include a display and a speaker. Input/Output device such as the display may be a touch screen that enables the human operator of autonomous device 102 to interact with operation determination device 200 for purposes such as manual intervention. Display for example, may be a Plasma display, a Liquid Crystal Display (LCD), a Light Emitting Diode (LED) display, an Organic Light Emitting Diode (OLED) display, and an Active Matrix OLED (AMOLED) display.

Operation determination device 200 may further include sensors 212 to evaluate various parameters of autonomous device 102. Operation determination device 200 may also communicate with sensors of the autonomous device 102 such as one or more image sensors and sound sensors like microphone that are integrated with the autonomous device 102 (not shown in the FIG.). Examples of sensor 212 of the operation determination device 200 may include, but are not limited to a camera (a depth camera, an infrared light camera, a visible light camera, or a position tracking camera), a 3D inclinometer sensor, accelerometer, gyroscope, pressure sensor, heat sensor, ambient light sensor, a compass, variometer, a tactile sensor, and a Global Positioning System it (GPS) sensor. By way of an example, a gyroscope and/or an accelerometer may be used to detect sudden deceleration or acceleration of autonomous device 102.

In an embodiment the sensors 212 of the operation device may include the image sensors and the sound sensors of the autonomous device 102 when the operation determination device 200 is integrated to the autonomous device 102. Sensors 212 of the operation determination device 200 may be image sensors and sound sensors that provide the pixel data and sound data, respectively, associated with an environment where the autonomous device may be located at an instance of time. In an example at least four sound sensors may be placed in a quadrilateral configuration on operation determination device 200 when the operation determination device is inbuilt into the autonomous device 102. Further, operation determination device 200 may also include a battery 214 in order to work independent of a power source, when operation determination device 200 is a mobile device independent of autonomous device 102.

Figure 3:
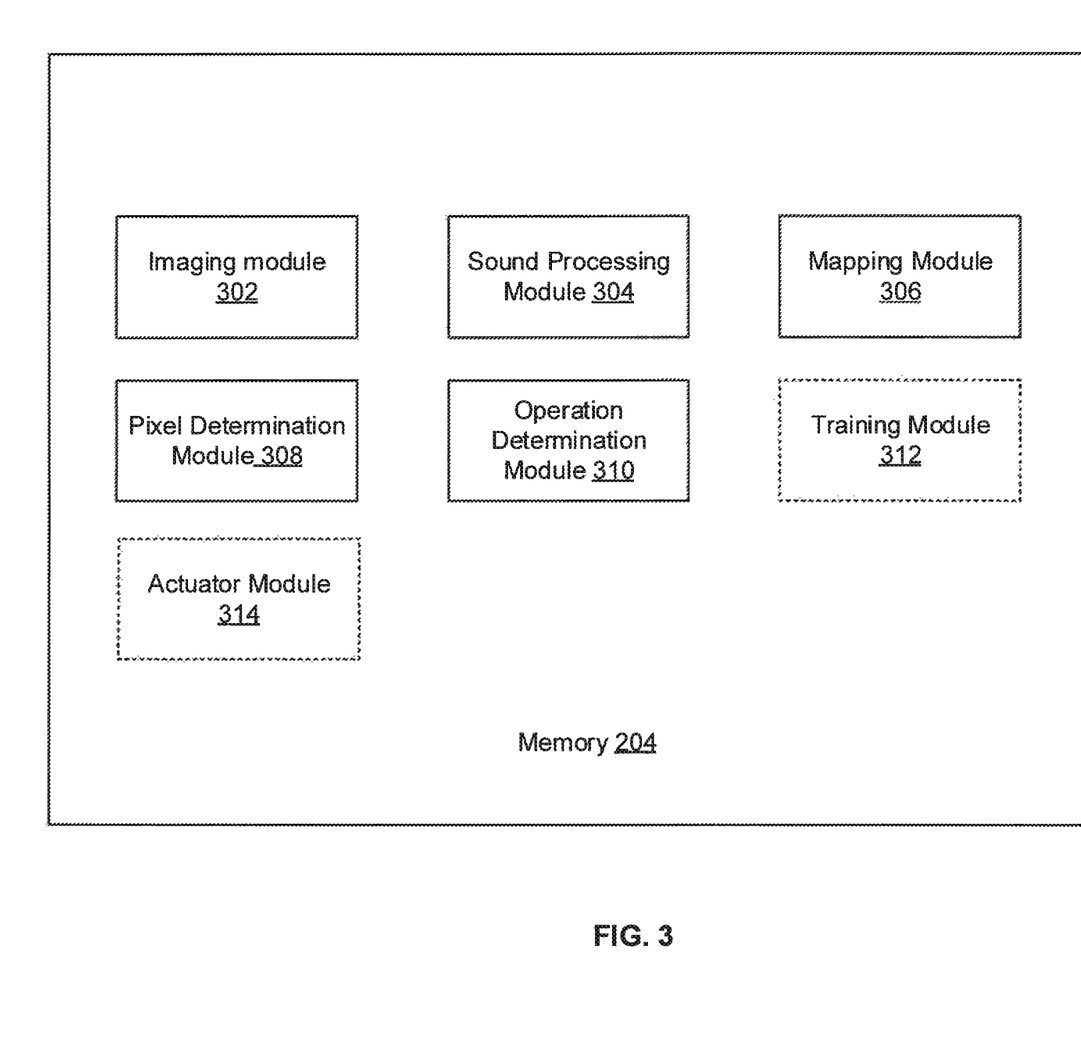
FIG. 3 is a block diagram of various modules in a memory of an operation determination device configured to determine operations of an autonomous device, in accordance with some embodiments of the present disclosure.

Various functionalities performed by operation determination device 200 are further explained in detail in conjunction with FIG. 3 illustrating various modules within memory 204. Referring now to FIG. 3, a block diagram of various modules within memory 204 of operation determination device 200 that is configured to determine operations of autonomous device 102 is illustrated, in accordance with an embodiment. Memory 204 includes an imaging module 302, sound data processing module 304, mapping module 306, pixel determination module 308, operation determination module 310, training module 312 and actuator module 314.

The operation determination device 200 may include imaging module 302 that may receive pixel data from the image sensors associated with autonomous device 102. In an embodiment image sensor data received may be an image of the environment at one or more instances of time, as captured by image sensors of autonomous device 102. For example, an autonomous device may be located at coordinates (x, y) at t1 instant of time when the image may be taken in real time. In some embodiments imaging module 302 may determine the configuration of the sensors before receiving the sensor inputs i.e. pixel data. Imaging module 302 may determine Sensor-ID, Source-ID and Group-ID and create memory instances based on them to store the pixel data.

In some embodiments, the pixel data or the image along with its time instance may be stored in the memory 204. In some embodiments, the pixel data associated with the image is rendered in the form of a matrix also known as image matrix. In some embodiments, the pixel data may be rendered in the matrix is in the same quadrilateral configuration as the at least four sound sensors associated with the autonomous device 102. This has been illustrated in FIG. 5c where 510 represents the matrix. In some embodiments, imaging module 302 may scale the matrix based on pre-defined distances between each of the four sound sensors. In some embodiments, imaging module 302 may cluster the pixel data received over a predefined time period and represent in the matrix. In an embodiment the imaging module 302 may generate a reaction vector matrix by identifying the change in vector values of the pixels by comparing the vector values of pixel matrix at one instance with that of vector values of pixel matrix at a preceding instance. The changes in vector values based on the comparison may be stored as the reaction vector matrix. Regression analysis may be performed and accurate values of the reaction vector may be generated by applying a determined regression weight. In an embodiment, the matrix may be formed by the accurate values of the reaction vectors.

Figure 5A:
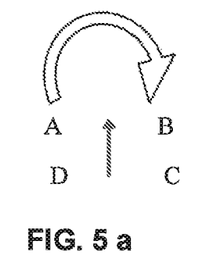
FIGS. 5a and 5b are illustrations showing the alignment of sound sensors and image sensor.
Figure 5B:
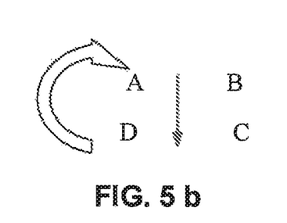
Figure 5C:
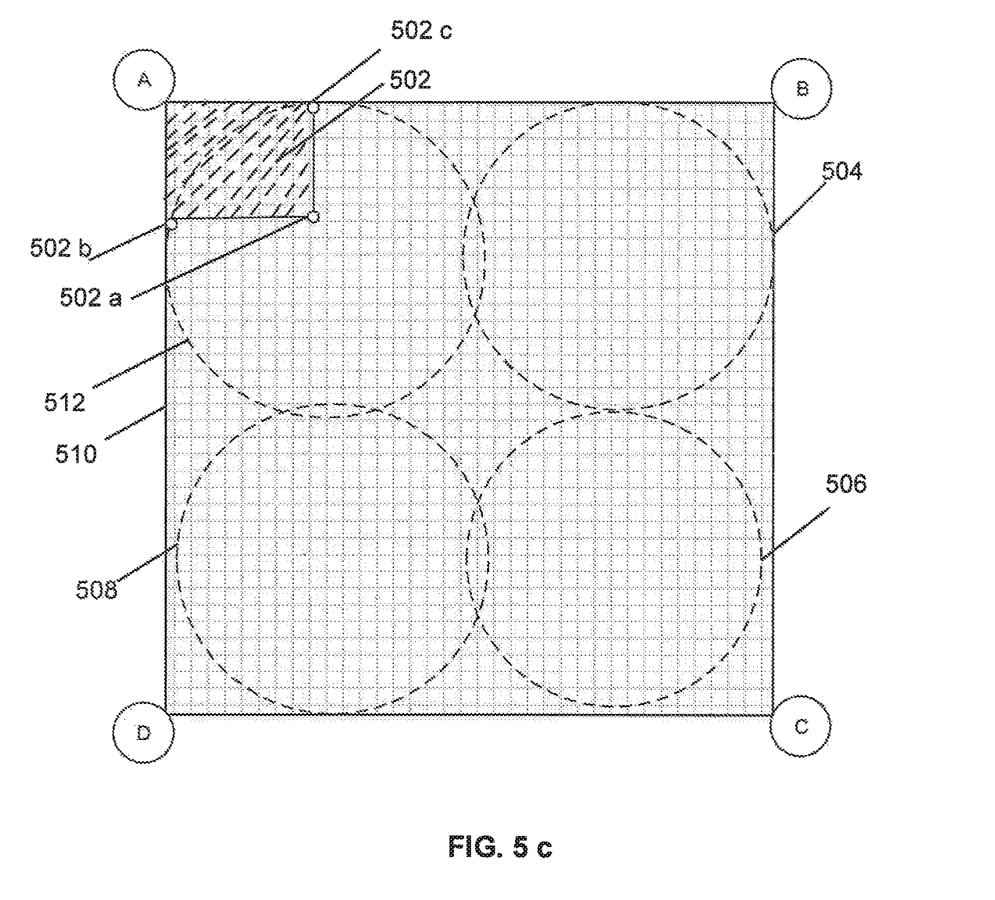
FIG. 5c is a diagram in accordance with an embodiment that illustrates mapping of pixel data with sound data for determining operations of autonomous device.

Sound processing module 304 may receive the sound data from sound sensors associated with autonomous device 102. In some embodiments, sound processing module 304 of the operation determination device 200 may store the sound data in form of vector representation for an instance of time. In some embodiments, sound processing module 304 may determine Sensor-ID, Source-ID and Group-ID and create memory instances based on them to store the sound data. In some embodiments the sound processing module 304 may be configured to process sound with one or more predefined frequencies. The one or more predefined frequencies may correspond to a predefined frequency range. In some embodiments, sound processing module 304 may receive sound data with a common frequency detected by the sound sensors, but different amplitudes at an instance of time based. In some embodiments, sound processing module 304 may be configured to receive sound data from least four sound sensors placed in a quadrilateral configuration on autonomous device 102. Sound processing module 304 may calculate the source of a sound based on difference in amplitude between a first sound sensor of at least four sound sensors recording maximum sound amplitude with a plurality of second sound sensors of the at least four sound sensors. Sound processing module 304 may select the first sound sensor sensing maximum amplitude value at an instance of time among all the sound sensors forming the quadrilateral configuration as the "source sensor". For example, there may be four sensors, namely A, B C and D located in four axes of a drone. Sensor A is located near the object 108 of FIG. 1 which is making sound 108a. Sensor A may read an amplitude value of 90 dB while sensor B, C and D may read 80 dB, 40 dB and 20 dB respectively. Sound processing module 304 may determine sensor A as the source sensor as it has recorded the highest amplitude. The difference in the values of each of the sensors i.e. B, C and D with A is then calculated by sound processing module 304. In some embodiments, clustering algorithm may be executed to find the quadrant with maximum detection of highest amplitude value among the at least four sensors detecting the sound. In an embodiment, the source sensor may be detected by using supremum distance algorithm or Chebyshev distance algorithm as represented by the equation $d(x, y)=\max[|xi-yi|]$. The distance between the first sound sensor and the plurality of second sound sensors may be determined by using Euclidean distance or any distance measurement technique (such as Manhattan distance measurement) based on the sound data in form of vector representation for an instance of time. In some embodiments, sound processing module 304 may associate each quadrant of the pixel matrix with each of the at least four sound sensors as represented in FIG. 5c.

Mapping Module 306 may map the pixel data with the sound data once they are processed by the respective imaging module 302 and the sound data processing module 304. In some embodiments, mapping module 306 may determine the orientation of the at least four sound sensors and the direction of the image sensor associated with the autonomous device 102. This has been represented in FIGS. 5a and 5b. In FIG. 5a the camera is faced upwards (shown with a straight arrow) and the sound sensors A, B C and D are located at the four corners of the quadrilateral configuration, A different orientation of the sensors are shown in FIG. 5b where the camera rotated in clock wise direction and is faced downwards and the sound sensors A, B, C and D are at the four corners in the quadrilateral configuration.

In some embodiments, there may be one or more pre-defined distances between each of the four sound sensors. In some embodiments each quadrant of the pixel data is associated with each of the at least four sound sensors by mapping module 206. In some embodiments, the matrix (pixel data) is scaled based on each of the one or more pre-defined distances. In some embodiments, mapping module 306 may map the difference in sound amplitude values on the matrix that is scaled, 508 in FIG. 5c represents the pixel region that has been identified to be mapped to the sound data. In some embodiments, mapping module 306 may map the sound data with the pixel data based on the distance calculation. Based on the determined reference sound sensor or the source sensor, mapping module 306 may compare the vector values of sound data from the source sensor with respect to the vector values of sound data of each of the at least four sound sensors to determine the position of the difference value on the matrix based by using distance measurement algorithms such as Euclidian, Manhattan and the like. This has been elaborated later in the specification in conjunction with FIG. 4 and FIG. 5c.

Pixel determination module 308 may identify one or more pixels on the image matrix based on the mapping by mapping module 306. In some embodiments, the pixel determination module 308 may determine the region in the environment surrounding the autonomous device 102 based on the identification of the one or more pixels. In some embodiments, the pixel determination module may identify the one or more pixels by working in conjunction with the training module 312. The one or more pixels may correspond to an object associated with the environment. In some embodiments, pixel determination module 308 may identify the region of environment surrounding the autonomous device by working in conjunction with the training module 312. Pixel determination module 308 may identify an object based on the identified pixels by mapping module 306. Pixel determination module 308 may take into account the sound data such as sound frequency for identifying the object.

Operation determination module 310 is configured to determine operations of autonomous device 102 based on the determination made by mapping module 306 with includes mapping of the pixel data with the sound data. In some embodiments, operation determination module 310 is configured to determine operations of the autonomous device 102 based on the object determination by the pixel determination module 308. In some embodiments, operation determination module 310 may be configured to determine a direction of movement of autonomous device 102 and thereby enable the actuator module 312 to navigate autonomous device 102 accordingly. In some embodiments, operation determination module 310 may determine the next set of operations for autonomous device 102 based on the mapping of the sound data with that of the pixel data. The pixel data that is rendered in a matrix format may be mapped with the sound data to identify the pixels associated with the sound data at an instant of time. In some embodiments, the sound data may be associated with a particular frequency. In some embodiments, the sound data may be associated with one or more predefined frequencies. The pixels that are associated with an image captured by one or image sensors associated with the autonomous device 102, may be identified and associated as the source of a sound such as sound 108a. In an example, operation determination module 310 may determine the next operation of the drone to take a close-up image of the pixel by moving towards the identified pixels. The identified pixels may correspond to an area of an image for with the pixel data has been received. Many variations of operations may be configured and is apparent to a person skilled in the art, based on the type of autonomous device 102 being used. For example, if the autonomous device is an autonomous vehicle then the operation determination module 310 may determine an alternate navigation path away from the identified pixels of the environment that has been mapped to the sound.

In some embodiments the identified one or more pixels and the corresponding sound data may be tagged with one or more identifiers by training module 312. In some embodiments, training module 312 may tag the sound data with identified one or more pixels based on the mapping. In some embodiments, training module 312 may work in conjunction with mapping module 306 to identify the one or more pixels.

In an embodiment, operation determination module 310 may determine navigation of autonomous device 102. For example, operation determination module 310 may determine a change in path for autonomous device 102 based on the identification of the one or more pixels corresponding to an object on its current path. Operation determination module 310 may determine an alternate path and a velocity based on the alternate path for the navigation of autonomous device 102. Actuator module 314 may receive the velocity and navigation path modification information from operation determination module 310. Based on this information, actuator module 314 initiates steering autonomous device 102. In other embodiments, actuator module 314 may operate in accordance with the instructions as received from the operation determination module 310 based on the nature or type of autonomous device 102.

A person having ordinary skill in the art will appreciate that the scope of the disclosure is not limited to realizing operation determination device 103 and autonomous device 102 as separate entities. In an embodiment, autonomous device 102 may be realized as operation determination device 103 integrated without departing from the scope of the disclosure.

Figure 4:
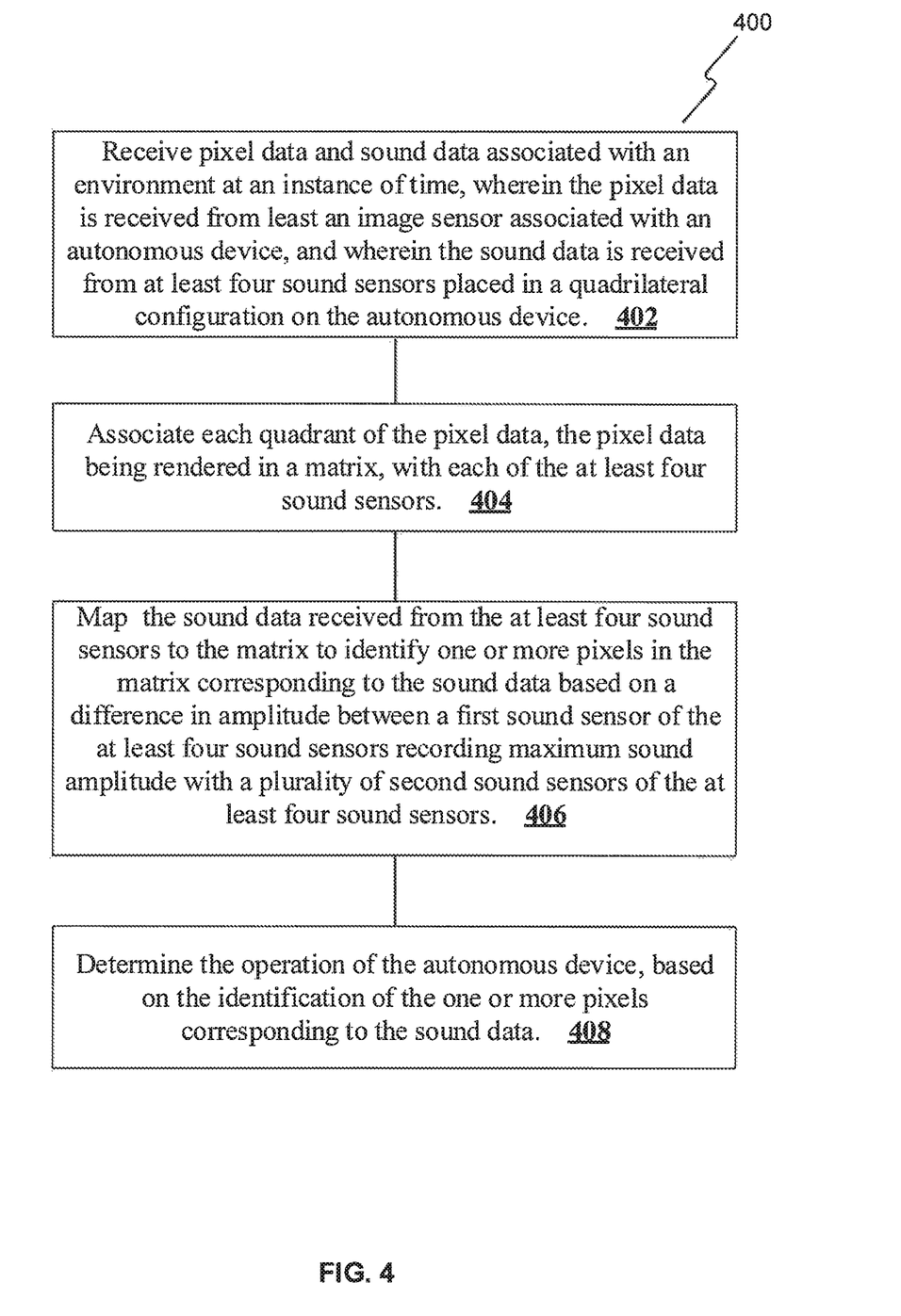
FIG. 4 is a flowchart illustrating a method of determining operations of an autonomous device, in accordance with some embodiments of the present disclosure.

Referring now to FIG. 4, a flowchart 400 of the method for determining operation of an autonomous device is illustrated, in accordance with an embodiment. To initialize operation determination device 200, if it is the first instance of using operation determination device 200, it first retrieves configuration parameters from a configuration database and maintains a local copy of these configuration parameters, i.e., local configuration, in memory 204. This is done when operation determination device 200 is being initialized for the first time. However, if operation determination device 200 is not being initialized for the first time, operation determination device 200 checks if there is any change in the configuration parameters stored in the configuration database when compared with the local copy of these configuration parameters. In case there is a change, operation determination device 200 updates the local copy with the new configuration parameters stored in the configuration database. If there is no change in the configuration parameters stored in the configuration database, operation determination device 200 loads the local copy of the configuration parameters.

Operation determination device 200 determines one or more operations that is suitable for autonomous device 102 based on identification of the one or more pixels corresponding to the sound data. As may be apparent to a person skilled in the art, the one or more operations determined by operation determination device 200 may be further configured in accordance to the nature and purpose of the autonomous device 102. For example, the autonomous device 102 may be a drone which is required to follow a particular object such as a vehicle 108 with a particular sound 108a. The operation determination module 310 in this scenario may be configured to approach towards an environment where there is high activity i.e. towards the location of the identified one or more pixels based on the mapping of the sound data and the pixel data. For example, the identification of the target object such as vehicle 108 by the autonomous device such as the drone may be based on the identification of the pixels based on mapping of the sound data and the pixel data. The mapping of the pixel data and the sound data has been elaborated further in the specification in conjunction with FIG. 5c. In this embodiment, operation determination device 200 may identify the navigation path of the drone to chase the object 108 based on the mapping. In some embodiments, operation determination device 200 may operate the drone to move closer to the region of the identified pixels based on the mapping and cause the drone to take dedicated snapshots or video of the identified region based on the pixel identification. Such and various other applicative uses of the method may be apparent to a person skilled in the art.

In accordance to an embodiment of the invention the method starts at step 402 and proceeds to step 404. Operation determination device 200 may receive pixel data and sound data associated with an environment at an instance of time. The pixel data is received from least an image sensor associated with the autonomous device 102. The sound data is received from at least four sound sensors placed in a quadrilateral configuration on autonomous device 102 at step 402. In some embodiments the sound sensors may be placed is a square configuration on the autonomous device 102. In an example the placement of the sound sensors may be on the four wings of the autonomous device 102 such as a quadcopter drone. Every sound sensor/detector detects sound data. In some embodiments the sound data includes a vector representing a frequency with amplitude values. For example, there may be sound sensors A, B, C and D at four wings of a quadcopter forming a square configuration. Each of the sensors A, B, C and D may detect a frequency of 70 Hz of varying amplitude and store it in the memory of the operation determination device as vectors. In some embodiments, the overall pixel matrix can be roughly divided into four clusters equally among the at least four sound sensors. For example, as shown in FIG. 5c, sound sensor A has the cluster 512, sound sensor B has cluster 508 sound sensor C has cluster 506 and sound sensor D has cluster 504 of the sound data.

In some embodiments, the pixel data may correspond to that of an image captured by the sound sensor. The pixel data is represented in the form of a matrix. In some embodiments, the pixel data may correspond to that of an image of an environment of the autonomous device 102. For example, the pixel data may be of an image of a road with a few vehicles. The pixel data in this case includes pixel dots forming a matrix. At step 404 operation determination device 200 may associate each quadrant of the pixel data, the pixel data being rendered in a matrix, with each of the at least four sound sensors.

At step 406, operation determination device 200 may map the sound data received from the at least four sound sensors to the matrix to identify one or more pixels in the matrix corresponding to the sound data based on a difference in amplitude between a first sound sensor of the at least four sound sensors recording maximum sound amplitude with a plurality of second sound sensors of the at least four sound sensors. In an embodiment, at t1 time instance the sound sensor that detects the loudest sound among the four sound sensors is selected as the source sensor for calculation purposes. In some embodiments, the highest amplitude as sensed/captured by one or more sound sensors of the at least four sound sensors, at an instant of time such as t1, may be taken into account and the sensor having the reading of maximum amplitude for t1 instant of time may be taken as a source sensor. In some embodiments, the sensor sensing/capturing the highest amplitude of sound with a predefined frequency may be made as the source sensor. In some embodiments, the sensor sensing/capturing the highest amplitude of sound of a frequency that is commonly captured across all the at least four sound sensors may only be taken into account. In some embodiments, the selection of the source sound sensor may be calculated by using supremum measurement method.

Based on the determined reference sound sensor or the source sensor, the operation determination device 200 starts comparing the vector values of sound data from the source sensor with respect to the vector values of sound data of each of the at least four sound sensors to determine the position of the difference value on the matrix based on distance measurement with distance measurement algorithms such as Euclidean or Manhattan techniques. For example, with reference to FIG. 5c the position 502 a is determined by calculating the Euclidean distance of second sensor D from first sensor A (source sensor). The position 502a is plotted diagonally by calculation the Euclidean distance of the second sensor C with respect to the first sensor A. Point 502b is similarly found by plotting the Euclidean distance of the second sensor D with respect to the first sensor A. Thus, operation determination device 200 may determine every position of the subtracted value of the determined distance on the matrix 510 as represented in FIG. 5c. It may be noted that more than four sound sensors may be placed along the perimeter of quadrilateral configuration and similarly Euclidean distance may be obtained with reference to the source sensor (first sensor) for all the second sound sensors, for more accurate identification of the one or more pixels. Operation determination device 200 may identify one or more pixels in the matrix such as represented by the shaded region 502 in FIG. 5c.

Further operation determination device 200 may determine operation of autonomous device 102, based on the identification of the one or more pixels corresponding to the sound data at step 408. In an embodiment, operation determination device 200 may determine the navigation of the autonomous device 102 based on the identification of the one or more pixels corresponding to the sound data.

Computing System

Figure 6:
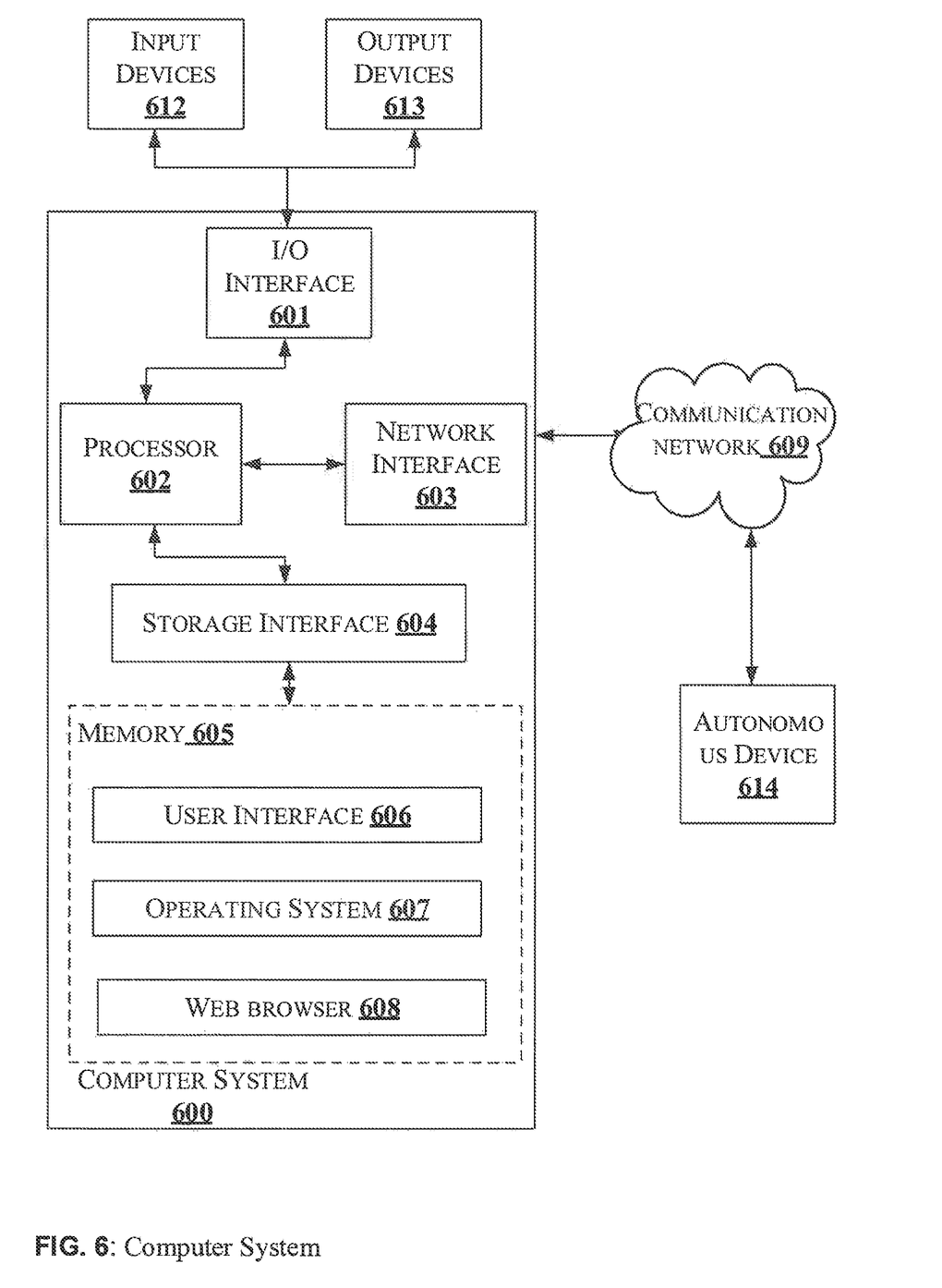
FIG. 6 is block diagram of an exemplary computer system for implementing embodiments consistent with the present disclosure.

FIG. 6 illustrates a block diagram of an exemplary computer system 600 for implementing embodiments consistent with the present disclosure. In an embodiment, the computer system 600 may be used to implement the method and device for determining operation of an autonomous device 102. The computer system 600 may include a central processing unit ("CPU" or "processor") 602. The processor 602 may include at least one data processor for determining one or more operations of autonomous device. The processor 602 may include specialized processing units such as, integrated system (bus) controllers, memory management control units, floating point units, graphics processing units, digital signal processing units, etc.

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 600 may include the operation determination device 200. The processor 602 may be disposed in communication with the communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 609 may include, without limitation, a direct interconnection, local area network (LAN), wide area network (WAN), wireless network (e.g., using Wireless Application Protocol), the Internet, etc. Using the network interface 603 and the communication network 609, the computer system 600 may communicate with an autonomous device 614. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 609 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607 etc. In some embodiments, computer system 600 may store user/application data, such as, the data, variables, records, etc., as described in this disclosure. Such databases may be implemented as fault-tolerant, relational, scalable, secure databases such as Oracle or Sybase.

The operating system 607 may facilitate resource management and operation of the computer system 600. Examples of operating systems include, without limitation, APPLE MACINTOSH® OS X, UNIX®, UNIX®-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 600 may implement a web browser 608 stored program component. The web browser 608 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX™, DHTML™, ADOBE® FLASH™, JAVASCRIPT™, JAVA™, Application Programming Interfaces (APIs), etc. In some embodiments, the computer system 600 may implement a mail server stored program component. The mail server may be an Internet mail server such as Microsoft Exchange, or the like. The mail server may utilize facilities such as ASP™, ACTIVEX™, ANSI™ C++/C #, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 600 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The present inventive method makes autonomous device 102 capable of handling situations that are unprecedented and not pre-programmed. By using the disclosed method an autonomous device may be intelligently able to make decisions in situations even when the autonomous device is untrained or is having minimal training. It provides intelligence to the autonomous device 103 to either avoid an environment/region of environment that is highly active or maintain tracking of such environment without having a training on multiple highly active scenarios. This method may also be used for training of an autonomous device to associate sound source with pixels. This helps in identification of objects with sound source. This method enables human vision like intelligence to the autonomous device that may be able to correlate the source of sound to that of the object. On training the autonomous device may be able to accurately identify sound sources along with pixels and accurately track or find an object. Further, the inventive method and system may help to determine objects where humans are not reachable. Apart from drone, it can be used in robots such as loco robots which are used in industries and collaborate with humans to perform various functions. This intelligence will help to navigate an autonomous device faster than the current state of art system. The disclosed invention can used in cars, spaceships, aerial vehicles and even in VR and multimedia field. Further the disclosed invention may be used in IOT based device where the environmental data may be varying a lot. The present disclosure may be applicable to medical devices such for surgery instruments and medical testing devices. The various embodiments of the disclosed method may be used to empower medical/surgical instruments in scenarios where navigations to internal body is required and magnetic images are difficult to decipher.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

I claim:

1. A method of determining operation of an autonomous device, the method comprising:
receiving, by an operation determination device, pixel data and sound data associated with an environment at an instance of time, wherein the pixel data is received from least an image sensor associated with the autonomous device, and wherein the sound data is received from at least four sound sensors placed in a quadrilateral configuration on the autonomous device, wherein the quadrilateral configuration comprises one or more pre-defined distances between each of the four sound sensors;
associating, by the operation determination device, each quadrant of the pixel data, the pixel data being rendered in a matrix, with each of the at least four sound sensors, wherein the matrix is scaled based on each of the one or more pre-defined distances, wherein the matrix is a reaction vector matrix generated by identifying change in vector values of the pixels, and wherein the change in the vector values of the pixels is identified by comparing vector values of the matrix at one instance with vector values of the matrix at a preceding instance;
mapping, by the operation determination device, the sound data received by the at least four sound sensors to the matrix to identify one or more pixels in the matrix corresponding to the sound data based on a difference in amplitude between a first sound sensor of the at least four sound sensors recording maximum sound amplitude with a plurality of second sound sensors of the at least four sound sensors; and
determining, by the operation determination device, the operation of the autonomous device based on the identification of the one or more pixels corresponding to the sound data.

2. The method as claimed in claim 1, wherein the one or more pixels correspond to an object associated with the environment.

3. The method as claimed in claim 1, further comprising tagging the identified one or more pixels and the corresponding sound data with one or more identifiers.

4. The method as claimed in claim 1, wherein the sound data comprises one or more predefined frequencies.

5. The method as claimed in claim 1, wherein the pixel data rendered in the matrix is in the same quadrilateral configuration as the at least four sound sensors.

6. The method as claimed in claim 1, wherein the operation comprises navigating the autonomous device.

7. An operation determination device for determining operation of an autonomous device, the operation determination device comprising a processor; and a memory communicatively coupled to the processor, wherein the memory stores processor-executable instructions, which, on execution, cause the processor to:
receive pixel data and sound data associated with an environment at an instance of time, wherein the pixel data is received from at least an image sensor associated with the autonomous device, and wherein the sound data is received from at least four sound sensors placed in a quadrilateral configuration on the autonomous device, wherein the quadrilateral configuration comprises one or more pre-defined distances between each of the four sound sensors;
associate each quadrant of the pixel data, the pixel data being rendered in a matrix, with each of the at least four sound sensors,
wherein the matrix is scaled based on each of the one or more pre-defined distances, wherein the matrix is a reaction vector matrix generated by identifying change in vector values of the pixels, and wherein the change in the vector values of the pixels is identified by comparing vector values of the matrix at one instance with vector values of the matrix at a preceding instance;
map the sound data captured by the at least four sound sensors to the matrix to identify one or more pixels in the matrix corresponding to the sound data based on a difference in amplitude between a first sound sensor of the at least four sound sensors recording maximum sound amplitude with a plurality of second sound sensors of the at least four sound sensors; and
determine the operation of the autonomous device, based on the identification of the one or more pixels corresponding to the sound data.

8. The device as claimed in claim 7, wherein the one or more pixels correspond to an object associated with the environment.

9. The device as claimed in claim 7, further comprising tagging the identified one or more pixels and the corresponding sound data with one or more identifiers.

10. The device as claimed in claim 7, wherein the sound data comprises one or more predefined frequencies.

11. The device as claimed in claim 7, wherein the pixel data rendered in the matrix is in the same quadrilateral configuration as the at least four sound sensors.

12. The device as claimed in claim 7, wherein the operation comprises navigating the autonomous device.

13. An autonomous device comprising the operation determination device in accordance to claim 7.

14. A non-transitory computer readable medium including instructions stored thereon that when processed by at least one processor cause an operation determination device associated with an autonomous device to perform acts of:
receiving pixel data and sound data associated with an environment of the autonomous device at an instance of time, wherein the pixel data is received from least an image sensor associated with the autonomous device, and wherein the sound data is received from at least four sound sensors placed in a quadrilateral configuration on the autonomous device, wherein the quadrilateral configuration comprises one or more pre-defined distances between each of the four sound sensors;
associating, by the operation determination device, each quadrant of the pixel data, the pixel data being rendered in a matrix, with each of the at least four sound sensors,
wherein the matrix is scaled based on each of the one or more pre-defined distances, wherein the matrix is a reaction vector matrix generated by identifying change in vector values of the pixels, and wherein the change in the vector values of the pixels is identified by comparing vector values of the matrix at one instance with vector values of the matrix at a preceding instance;
mapping the sound data received by the at least four sound sensors to the matrix to identify one or more pixels in the matrix corresponding to the sound data based on a difference in amplitude between a first sound sensor of the at least four sound sensors recording maximum sound amplitude with a plurality of second sound sensors of the at least four sound sensors; and
determining the operation of the autonomous device based on the identification of the one or more pixels corresponding to the sound data.

15. The non-transitory computer readable medium as claimed in claim 14, wherein the operation comprises navigating the autonomous device.

* * * * *